(12) United States Patent
Giannakopoulos

(10) Patent No.: US 11,873,860 B2
(45) Date of Patent: Jan. 16, 2024

(54) TRANSMISSION SHAFT

(71) Applicant: Crompton Technology Group Limited, Solihull (GB)

(72) Inventor: Ioannis Giannakopoulos, London (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 155 days.

(21) Appl. No.: 17/494,215

(22) Filed: Oct. 5, 2021

(65) Prior Publication Data
US 2022/0025923 A1  Jan. 27, 2022

Related U.S. Application Data

(62) Division of application No. 16/167,802, filed on Oct. 23, 2018, now Pat. No. 11,408,464.

(30) Foreign Application Priority Data

Nov. 1, 2017 (GR) .............................. 20170100491

(51) Int. Cl.
*F16C 3/02* (2006.01)
*B29C 65/00* (2006.01)
*B29C 70/48* (2006.01)
*B29C 57/00* (2006.01)
(Continued)

(52) U.S. Cl.
CPC ............. *F16C 3/026* (2013.01); *B29C 57/00* (2013.01); *B29C 66/5221* (2013.01); *B29C 66/52272* (2013.01); *B29C 66/721* (2013.01); *B29C 70/48* (2013.01); *B29C 70/86* (2013.01);
(Continued)

(58) Field of Classification Search
CPC . B29C 57/00; B29C 66/5221; B29L 2031/75; B29L 2023/00; F16C 2208/82; F16C 2226/30; F16C 3/023

USPC ....... 156/60, 91, 92, 93, 196, 212, 250, 252, 156/256, 305, 307.1, 307.3; 138/153, 138/109; 464/181, 182, 92, 96; 428/36.9, 36.91

See application file for complete search history.

(56) References Cited

U.S. PATENT DOCUMENTS 3,651,661 A * 3/1972 Darrow ................... F16C 3/026
464/181
3,970,495 A    7/1976 Ashton et al.
4,065,339 A    12/1977 Lippert et al.
(Continued)

FOREIGN PATENT DOCUMENTS

DE   102011112708 A1   3/2013
GB      2141722 A      1/1985
(Continued)

OTHER PUBLICATIONS

Extended European Search Report for International Application No. 18152338.2 dated Aug. 29, 2018, 9 pages.

*Primary Examiner* — Philip C Tucker
*Assistant Examiner* — Brian R Slawski
(74) *Attorney, Agent, or Firm* — CANTOR COLBURN LLP

(57) ABSTRACT

A composite transmission shaft includes a shaft portion, and a flanged end fitting. The flanged end fitting comprises a flared sleeve comprising a tubular portion and a flared portion, and a reinforcement portion fixed to the flared portion of the sleeve. The flanged end fitting and shaft portion have been resin transfer moulded together to form the transmission shaft.

7 Claims, 2 Drawing Sheets

(51) Int. Cl.
*B29C 70/86* (2006.01)
*B29L 31/00* (2006.01)

(52) U.S. Cl.
CPC ........... *F16C 3/023* (2013.01); *B29L 2031/75* (2013.01); *F16C 2208/82* (2013.01); *F16C 2226/30* (2013.01)

(56) References Cited

U.S. PATENT DOCUMENTS

| | | | |
|---|---|---|---|
| 4,702,498 | A | 10/1987 | Mueller et al. |
| 4,813,457 | A * | 3/1989 | Offringa ................. B29C 70/32 285/425 |
| 5,685,933 | A | 11/1997 | Ohta et al. |
| 8,813,335 | B2 | 8/2014 | Geislinger et al. |
| 2001/0023734 | A1 | 9/2001 | Tavakoli et al. |
| 2012/0270006 | A1 | 10/2012 | McMillan |
| 2013/0207303 | A1 * | 8/2013 | Marlin ................... B29C 70/32 264/241 |
| 2014/0079482 | A1 | 3/2014 | Sohl |
| 2017/0203521 | A1 | 7/2017 | Larson |
| 2019/0128317 | A1 | 5/2019 | Giannakopoulos |

FOREIGN PATENT DOCUMENTS

| | | | |
|---|---|---|---|
| KR | 20010007891 A * | 2/2001 | |
| WO | 9820263 A1 | 5/1998 | |
| WO | 2017123399 A1 | 7/2017 | |

* cited by examiner

TRANSMISSION SHAFT

CROSS REFERENCE TO RELATED APPLICATIONS

The present application is a division of U.S. patent application Ser. No. 16/167,802, filed Oct. 23, 2018 which claims priority to Greek Patent Application No. 20170100491 filed Nov. 1, 2017, the entire contents of which are incorporated herein by reference.

FIELD

The invention relates to a composite transmission shaft, particularly to a composite transmission shaft comprising a shaft portion and a flanged end fitting.

BACKGROUND

Transmission shafts are used in high lift actuation systems in commercial and military aircraft. Typically, they comprise a composite tube fitted with metallic flanged end fittings. The metallic flanged end fittings are connected to the rest of the system using bolted connections, and provide the necessary structural and mechanical properties for the transmission shaft, including the ability to transmit the required torsional loads without structural degradation or failure.

However, the metallic end fittings are relatively heavy and so add weight to the system, which is undesirable in an aircraft. In order to reduce the weight, transmission shafts have been proposed—for example in US 2017/0203521 A1—in which the flanged portion is also formed of a composite material. Then, to achieve the necessary mechanical properties, the flanged portion of the transmission shaft is formed in its final form integrally with the shaft portion by winding fibres about a mandrel with a flared part. The flared part of the mandrel includes eyelet forms for winding the fibres around to form holes in the flanged end fitting for connecting bolts. The wound fibre preform is then cured, and metal eyelets are then inserted into the holes. While this approach reduces the weight, it increases the complexity of manufacturing.

SUMMARY

According to a first aspect of the disclosure there is provided a composite transmission shaft, comprising a shaft portion, and a flanged end fitting; wherein the flanged end fitting comprises a flared sleeve comprising a tubular portion and a flared portion, and a reinforcement portion fixed to the flared portion of the sleeve; and wherein the flanged end fitting and shaft portion have been resin transfer moulded together to form the transmission shaft.

In addition to the foregoing the reinforcement portion may be a first reinforcement portion and the flanged end fitting may comprise a second reinforcement portion fixed to the flared portion of the sleeve and disposed on an opposite side of the flared portion to the first reinforcement portion. The first and second reinforcement portions may be annular.

In addition or as an alternative to the foregoing the reinforcement portion may comprise fibres oriented circumferentially and radially.

In addition or as an alternative to the foregoing the flared portion of the sleeve may comprise a plurality of holes punched through it, each one of which may be delimited by a plurality of fibre ends; wherein the reinforcement portion may comprise a plurality of holes formed in it, which holes may be delimited by portions of continuous fibres; and wherein the holes in the flared portion and the holes in the reinforcement portion may be aligned so that holes are formed in the flange of the flanged end fitting.

In addition or as an alternative to the foregoing the reinforcement portion may have been fixed to the flared portion of the sleeve by stitching prior to resin transfer moulding.

According to a second aspect of the disclosure there is provided a method of manufacturing a composite transmission shaft comprising a shaft portion, and a flanged end fitting, the method comprising: providing a sleeve which is substantially tubular; deforming an end of the sleeve to form a flared portion; fixing a reinforcement portion to the flared portion of the sleeve to form a preform of the flanged end fitting comprising a tubular portion and a flange; positioning the tubular portion of the flanged end fitting in contact with the shaft portion; and resin transfer moulding the shaft portion and the flanged end fitting together to form the transmission shaft.

In addition to the foregoing, the method may comprise punching a plurality of holes in the flared portion of the sleeve prior to fixing the reinforcement portion thereto.

In addition or as an alternative to the foregoing the method may comprise forming the reinforcement portion with a plurality of holes therein.

In addition or as an alternative to the foregoing the method may comprise aligning the holes in the reinforcement portion with the holes in the flared portion of the sleeve before stitching the reinforcement portion to the flared portion.

In addition or as an alternative to the foregoing the method may comprise forming a transmission shaft as described with reference to any of the first aspects of the disclosure.

BRIEF DESCRIPTION OF THE FIGURES

Embodiments of the invention will be described below by way of example only and with reference to the accompanying drawing in which.

DETAILED DESCRIPTION

Figure 1:
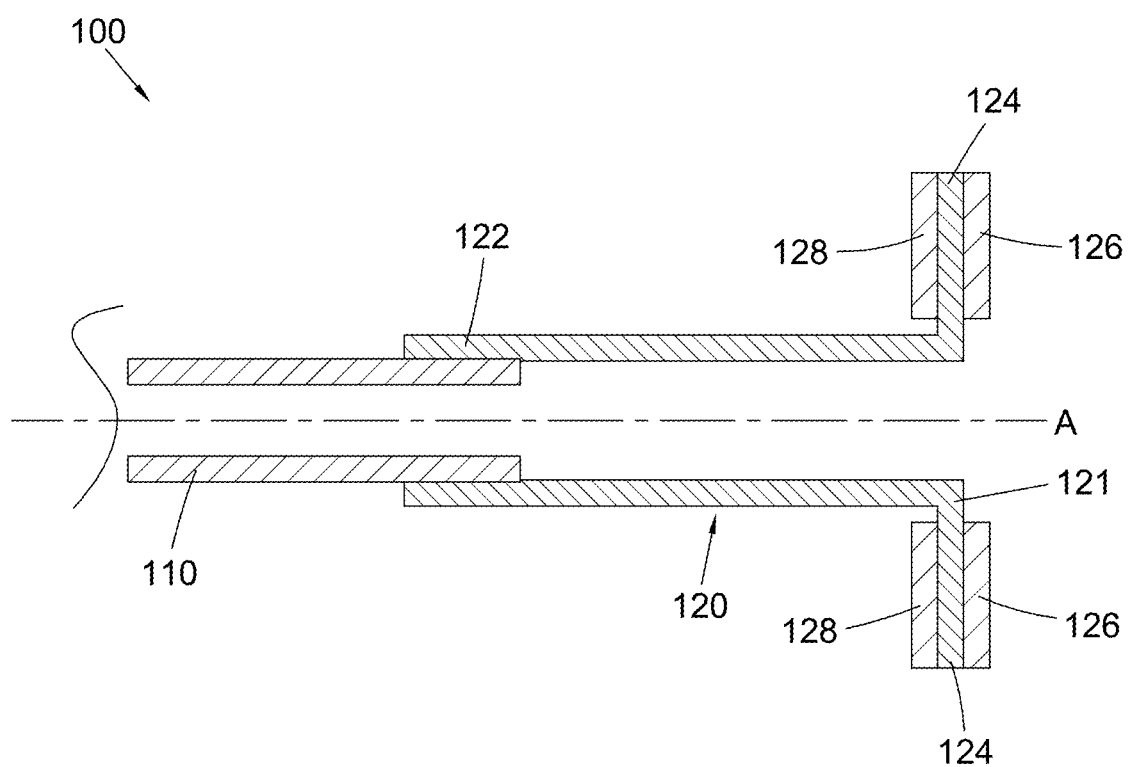
FIG. 1 shows a schematic version of a composite transmission shaft.

According to a first embodiment there is provided a composite transmission shaft 100, comprising a shaft portion 110, and a flanged end fitting 120. The flanged end fitting 120 comprises a flared sleeve 121 comprising a tubular portion 122 and a flared portion 124, and a reinforcement portion 126, 128 fixed to the flared portion 124 of the sleeve 121. The flanged end fitting 120 and shaft portion 110 have been resin transfer moulded together to form the transmission shaft 100.

The transmission shaft 100 is therefore an all-composite transmission shaft 100, formed entirely of composite material. The flared portion 124 of the sleeve 121 and the reinforcement portion 126, 128 fixed to it together comprise the flange of the flanged end fitting 120.

The transmission shaft 100 is formed by resin transfer moulding the flanged end fitting 120 together with the shaft portion 110, though the preform versions of the flanged end fitting 120 and shaft portion 110 may also be connected by other means prior to resin transfer moulding, such as stitching.

The shaft portion 110 is composite and may be formed from a wound, braided, stitched or woven sheet of continuous fibre preform. The fibres may be carbon fibres comprising carbon filaments. The flanged end fitting 120 and/or flared sleeve 121 is also composite and may be formed from a wound, braided, stitched or woven sheet of continuous fibre preform. The fibres may be carbon fibres comprising carbon filaments.

The transmission shaft 100 may be made using only one resin transfer moulding process which joins together the preform of the shaft portion 110 and the preform of the flanged end fitting 120.

The flared portion 124 of the sleeve 121 may be substantially the same shape as the reinforcement portion 126, 128. The flared portion 124 may be substantially annular and the reinforcement portion 126, 128 may be substantially annular. The flared portion 124 and the reinforcement portion 126, 128 may be rings. Alternatively, the reinforcement portion 126, 128 may be shaped differently to the flared portion 124 while still providing mechanical reinforcement. For example, the flared portion 124 may be annular and the reinforcement portion 126, 128 may be substantially triangular, quadrilateral, polygonal etc.

The shaft portion 110 and the tubular portion 122 of the sleeve 121 may have substantially the same cross-sectional shape and corresponding dimensions (e.g. overlapping dimensions) so that at least a portion of one is disposed within at least a portion of the other so that those portions are fixed together by the resin transfer moulding process. They may be cylindrical and may have substantially the same diameter.

The reinforcement portion may be a first reinforcement portion 126 and the flanged end fitting 120 may comprise a second reinforcement portion 128 fixed to the flared portion 124 of the sleeve 121 and disposed on an opposite side of the flared portion 124 to the first reinforcement portion 126. Both reinforcement portions 126, 128 may have the same or complementary shapes and/or properties. The first and second reinforcement portions 126, 128 may each be annular, or any suitable shape as described above. Then, the flared portion 124 of the sleeve 121 may be disposed between two reinforcement portions 126, 128, so that the flange of the flanged end fitting 120 comprises a sandwich of cured fibre preforms.

The reinforcement portion 126, 128 may comprise fibres oriented circumferentially and radially. The fibres of this and other parts of the transmission shaft may be arranged to improve and/or optimise the transmission of torsional loads through the flanged end fitting 120.

The shaft portion 110 may be wound and may comprise fibres having multiple winding angles. The shaft portion 110 may be braided or woven. The fibres may be arranged to improve and/or optimise the transmission of torsional loads through the shaft portion 110.

The fibres of any part of the transmission shaft may be arranged to improve torsional and/or axial stiffness, axial strength, and/or impact resistances. A plurality of different fibres and fibre orientations may be used to optimise the characteristics of the transmission shaft, and hence its performance.

The flared portion 124 of the sleeve 121 may comprise a plurality of holes punched through it, each one of which may be delimited by a plurality of fibre ends. The reinforcement portion 126, 128 may comprise a plurality of holes formed in it, which holes are delimited by portions of continuous fibres. The holes in the flared portion 124 and the holes in the reinforcement portion 126, 128 may be aligned so that holes are formed in the flange of the flanged end fitting 120.

The holes in the flared portion 124 may be made by punching a hole in the flared portion 124 of the sleeve 121, and hence may be surrounded by cut fibres delimiting the hole. The composite material of the flared portion 124 surrounding each hole may therefore be weaker as a consequence of the hole and the fibre ends. The reinforcement portion 126, 128 may comprise holes punched therein, which holes would then be delimited by fibre ends like the holes in the flared portion 124 of the sleeve 121. However, preferably the reinforcement portion 126, 128 may be formed (e.g. stitched, woven, wound or braided) with holes in it, for example by winding or braiding about pegs, and therefore may not comprise fibre ends in the regions near the holes, or may primarily comprise continuous portions of fibre delimiting the holes. Thus, the holes in the reinforcement portion 126, 128 may be stronger and serve to reinforce the flange of the flanged end fitting 120.

Each hole of the flared portion 124 may be aligned with a corresponding hole in the reinforcement portion 126, so that all holes in the flange of the flanged end fitting 120 are aligned. This may permit bolts or the like to be passed through the flange of the flanged end fitting 120 so as to allow fixing of the flange to another surface, thereby fixing the transmission shaft 100. The holes may then be used to connect the transmission shaft 100 to other components as needed.

The reinforcement portion 126, 128 may have been fixed to the flared portion 124 of the sleeve 121 by stitching prior to resin transfer moulding, e.g. as a preform. Where there are two reinforcement portions 126, 128, the second reinforcement portion 128 may comprise all the features of the first reinforcement portion 126, including holes delimited by continuous composite fibres, which holes may be aligned with those of the flared portion 124, and hence also with those of the first reinforcement portion 126. The second reinforcement portion 128 may be fixed to the flared portion 124 by stitching, in the same manner as the first reinforcement portion 126.

According to a second embodiment there is provided a method of manufacturing a composite transmission shaft 100 comprising a shaft portion 110, and a flanged end fitting 120. The method comprises: providing a sleeve 121 which is substantially tubular; deforming an end of the sleeve to form a flared portion 124; fixing a reinforcement portion 126, 128 to the flared portion 124 of the sleeve 121 to form a preform of the flanged end fitting 120 comprising a tubular portion 122 and a flange; positioning the tubular portion 122 of the flanged end fitting 120 in contact with the shaft portion 110; and resin transfer moulding the shaft portion 110 and the flanged end fitting 120 together to form the transmission shaft 100.

The resin transfer moulding process joins and fixes all of the components of the transmission shaft 100 together to form the final product. The flange of the flanged end fitting 120 is formed from the flared portion 124 of the sleeve 121 and the reinforcement portion 126, 128 joined together. The tubular portion 122 of the flanged end fitting 120 is formed from the tubular portion 122 of the sleeve 121, and is joined to the shaft portion 110 by the resin transfer moulding process. Prior to the resin transfer moulding process, the shaft portion 100, the flared sleeve 121, and the reinforcement portion 126, 128 are preforms.

For the resin transfer moulding process, the assembled preforms of the shaft portion 110, the flared sleeve 121, and the reinforcement portion 126, 128 may all be positioned in a suitable mould capable of applying pressure through the thickness of the assembly. A resin and/or a resin system may then be transferred into the mould and driven in the preforms as a result of the pressure applied on the preforms by the mould. A plurality of resins may be used, which may be thermoset and/or thermoplastic. The resin may be chosen to optimise the mechanical performance of the transmission shaft, for example for torsional strength, axial strength, impact resistance and/or thermal stability.

The step of deforming the end of the sleeve 121 to form the flared portion 124 may weaken the structure of the sleeve 121 by disrupting the arrangement of the fibres in the sleeve 121. The reinforcement portion 126, 128 may then be used to strengthen the weakened sleeve 121 and improve and/or optimise the transmission of torsional loads through the flange of the flanged end fitting 120 and reduce the risk of structural degradation or failure during use.

The method may comprise punching a plurality of holes in the flared portion 124 of the sleeve 121 prior to fixing the reinforcement portion 126, 128 thereto. This step may further weaken the structure of the sleeve 121 by breaking fibres within the flared portion 124. The resulting hole will be formed by breaking or cutting fibres and hence will be surrounded by fibre ends, as described above with reference to the first embodiment.

The method may comprise forming the reinforcement portion 126, 128 with a plurality of holes therein. The method may comprise weaving, winding, stitching or braiding the reinforcement portion 126, 128 to include holes therein. Then, the holes may be delimited by continuous portions of fibres as described with reference to the first embodiment and hence may allow the reinforcement portion 126, 128 to be stronger than if holes were punched in it. However, the method may include punching holes in the reinforcement portion 126, 128, which will anyway serve to reinforce the flared portion 124 of the sleeve 121. The method may comprise forming the holes so that fibre orientations thereabout improve and/or optimise the transmission of torsional loads.

The method may comprise aligning the holes in the reinforcement portion 126, 128 with the holes in the flared portion 124 of the sleeve 121 before stitching the reinforcement portion 126, 128 to the flared portion 124. Other means of joining the reinforcement portion 126, 128 to the flared portion 124 may be used prior to the resin transfer moulding process. Thus, the reinforcement portion 126, 128 may further reinforce the flared portion 124 of the sleeve 121.

The method may comprise stitching a second reinforcement portion 128 to the flared portion 124 of the sleeve 121 on a side of the flared portion 124 opposite the first reinforcement portion 124. The second reinforcement portion 128 may be substantially the same as the first reinforcement portion 126, and the method may comprise aligning holes of the second reinforcement portion 128 with the holes of the flared portion 124.

The step of positioning the tubular portion 122 of the flanged end fitting 120 in contact with the shaft portion 110 may comprise aligning fibre orientations of the shaft portion 110 so as to improve or optimise the transmission of torsional loads therethrough.

The method may comprise determining a stress analysis of the transmission shaft in intended use and preparing the preforms such that fibres of the respective preforms are aligned with predetermined directions to optimise certain performance characteristics of the final product, e.g. ultimate torsional strength.

The method may comprise forming a transmission shaft as described above with reference to the first embodiment.

According to a third embodiment there is provided a preform for a flanged end fitting 120, comprising a flared sleeve 121 comprising a tubular portion 122 and a flared portion 124, and a reinforcement portion 126, 128 attached to the flared portion 124 of the sleeve 121.

The reinforcement portion of the preform for a flanged end fitting 120 may be a first reinforcement portion 126 and preform may comprise a second reinforcement portion 128 fixed to the flared portion 124 of the sleeve 121 and disposed on an opposite side of the flared portion 124 to the first reinforcement portion 126.

The preform of the third embodiment may be suitable for use in the method described above in relation to the second embodiment, and—once cured—may provide a flanged end fitting 120 comprising any and all of the features of the flanged end fitting 120 described above with reference to the first embodiment.

EXAMPLE

In more detail, a transmission shaft 100 is shown in FIG. 1, comprising a shaft portion 110 and a flanged end fitting 120. Although shown in cross-section, the transmission shaft 100 is circularly symmetric about an axis A. The flanged end fitting 120 comprises a sleeve 121 comprising a tubular portion 122 and a flared portion 124. The flanged end fitting 120 further comprises a first reinforcement portion 126 and a second reinforcement portion 128 stitched and resin transfer moulded to the flared portion 124 of the sleeve 121.

The shaft portion 110 is formed of a wound or braided carbon fibre sock. The sleeve 121 is formed of a wound or braided carbon fibre sock. The tubular portion 122 of the sleeve 121 is substantially the same diameter as the shaft portion 110. The flared portion 122 of the sleeve gradually flares outwards. The first reinforcement portion 126 is a stitched carbon fibre preform with holes and fibre directions which enable and improve the transmission of torsional loads. Some of the fibres in the reinforcement portions 126 and 128 are arranged in circumferential directions, and others are arranged in radial directions. The second reinforcement portion 128 is substantially the same as the first, and is disposed on an opposite side of the flared portion 124 of the sleeve 121 to the first reinforcement portion 126.

Figure 2:
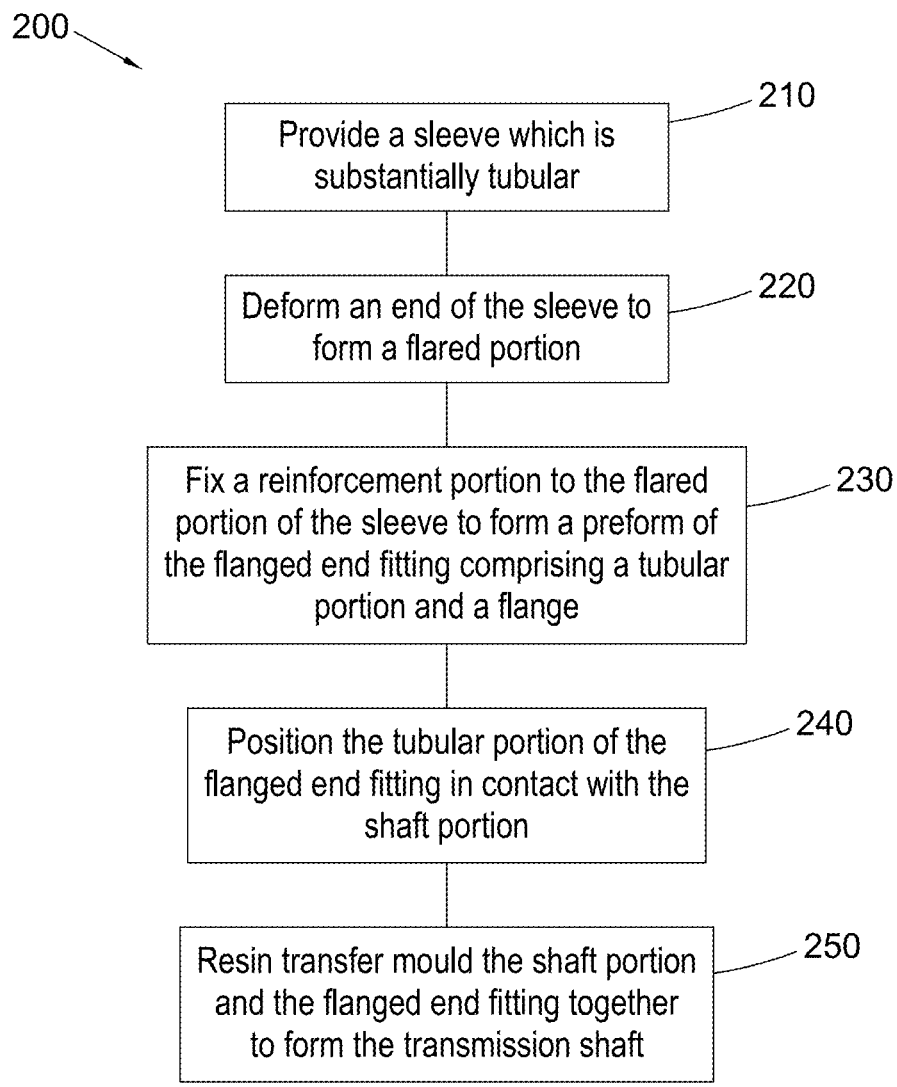
FIG. 2 shows a flowchart of a method of manufacturing a composite transmission shaft.

FIG. 2 shows a flowchart of a method 200 of manufacturing a composite transmission shaft. During manufacture, the sleeve 121 is provided at step 210. The sleeve 121 starts as a tubular shape of substantially constant diameter along its length. Then, one end of the sleeve 121 is folded or deformed radially outwards at step 220 so as to form the flared portion 124 with a short shank. The tubular portion 122 is then formed of the part of the sleeve 121 that has not been deformed.

Holes (not shown) are then punched through the flared portion 124 of the sleeve 121 to allow the connection of bolts for mounting the transmission shaft 100 for use. The reinforcement portions 126 and 128 in the form of stitched preforms are aligned with the flared portion 124 so that holes in the reinforcement portions 126 and 128 align with the holes in the flared portion 124. At step 230 the reinforcement portions are stitched directly on the flared portion 124 of the sleeve 121.

At step 240 the flanged end fitting 120 is laid up together with the shaft portion 110 so that the shaft portion 110 is inserted partially within the tubular portion 122 of the flanged end fitting 120. Finally at step 250 the entire lay-up is resin transfer moulded to form the final transmission shaft. The process of resin transfer moulding joins the shaft portion 110 to the tubular portion 122 of the sleeve 121. It also secures the reinforcement portions 126 and 128 to the flared portion 124 of the sleeve 121.

A transmission shaft as described provides an all composite component for the transmission of torsional loads, providing weight and cost reductions against the typical partly composite tubes. The described method also provides a reduction in manufacturing complexity. Due to the use of a stitched preform, the flange can be arranged to achieve the strength and stiffness requirements of the actuation system. The method further negates the need to drill holes in a cured laminate, which process is known to be associated with significant costs and poor product quality.

The invention claimed is:

1. A method of manufacturing a composite transmission shaft comprising a shaft portion, and a flanged end fitting, the method comprising:
providing a sleeve which is substantially tubular;
after providing the sleeve, deforming an end of the sleeve to form a flared portion;
after deforming the end, fixing a reinforcement portion to the flared portion of the sleeve to form a preform of the flanged end fitting comprising a tubular portion and a flange;
after fixing the reinforcement, positioning the tubular portion of the flanged end fitting in contact with the shaft portion; and
after positioning the tubular portion, resin transfer moulding the shaft portion and the flanged end fitting together to form the transmission shaft.

2. A method as claimed in claim 1, comprising punching a plurality of holes in the flared portion of the sleeve prior to fixing the reinforcement portion thereto.

3. A method as claimed in claim 2, comprising forming the reinforcement portion with a plurality of holes therein.

4. A method as claimed in claim 3, comprising aligning the holes in the reinforcement portion with the holes in the flared portion of the sleeve before stitching the reinforcement portion to the flared portion.

5. A method of manufacturing a composite transmission shaft comprising a shaft portion, and a flanged end fitting, the method comprising:
providing a sleeve which is substantially tubular;
deforming an end of the sleeve to form a flared portion;
fixing a reinforcement portion to the flared portion of the sleeve to form a preform of the flanged end fitting comprising a tubular portion and a flange;
positioning the tubular portion of the flanged end fitting in contact with the shaft portion; and
resin transfer moulding the shaft portion and the flanged end fitting together to form the transmission shaft;
the method further comprising:
punching a plurality of holes in the flared portion of the sleeve prior to fixing the reinforcement portion thereto.

6. A method as claimed in claim 5, comprising forming the reinforcement portion with a plurality of holes therein.

7. A method as claimed in claim 6, comprising aligning the holes in the reinforcement portion with the holes in the flared portion of the sleeve before stitching the reinforcement portion to the flared portion.

* * * * *